US008847112B2

(12) United States Patent
Panarello et al.

(10) Patent No.: US 8,847,112 B2
(45) Date of Patent: Sep. 30, 2014

(54) METHOD AND APPARATUS TO SCRIBE A LINE IN A THIN FILM MATERIAL USING A BURST OF LASER PULSES WITH BENEFICIAL PULSE SHAPE

(75) Inventors: Tullio Panarello, St-Lazare (CA); Matthew Rekow, Santa Cruz, CA (US); Richard Murison, St-Lazare (CA)

(73) Assignee: ESI-Pyrophotonics Lasers, Inc., Quebec, CA (US)

( * ) Notice: Subject to any disclaimer, the term of this patent is extended or adjusted under 35 U.S.C. 154(b) by 423 days.

(21) Appl. No.: 12/889,435

(22) Filed: Sep. 24, 2010

(65) Prior Publication Data

US 2011/0233177 A1 Sep. 29, 2011

Related U.S. Application Data

(60) Provisional application No. 61/245,582, filed on Sep. 24, 2009.

(51) Int. Cl.
*B23K 26/38* (2014.01)

(52) U.S. Cl.
USPC .................................. 219/121.69; 219/121.61

(58) Field of Classification Search
USPC ............. 219/121.68, 121.69, 121.61, 121.72, 219/121.8
See application file for complete search history.

(56) References Cited

U.S. PATENT DOCUMENTS 3,626,141 A * 12/1971 Daly ........................ 219/121.68
4,371,740 A 2/1983 Clem
5,296,674 A * 3/1994 Praschek et al. ......... 219/121.69
5,400,350 A 3/1995 Galvanauskas
5,886,808 A 3/1999 Skeldon et al.
6,639,178 B2 * 10/2003 Kupisiewicz ............ 219/121.69
6,666,983 B2 12/2003 Marietti et al.
6,826,209 B1 11/2004 Morita et al.
6,885,683 B1 4/2005 Fermann et al.

(Continued)

FOREIGN PATENT DOCUMENTS

JP 8-10970 1/1996
JP 2002231986 A 8/2002

(Continued)

OTHER PUBLICATIONS

Di Teodoro et al., "High-Power Pulsed Fibre Source at 1567 nm," Electronics Letters, Nov. 25, 2004, vol. 40, Issue 24, pp. 1525-1526.

(Continued)

*Primary Examiner* — Geoffrey S Evans
(74) *Attorney, Agent, or Firm* — Haynes Beffel & Wolfeld LLP

(57) ABSTRACT

A series of laser pulses in a pulse train, each pulse with a beneficial temporal power shape instead of the conventional laser temporal power shape, scribes a line in a thin film of material on a substrate. The beneficial temporal pulse shape has a spike/plateau chair shape or a square pulse shape. Scribing a line in the thin film is achieved by placing the series of laser pulse spots on the line to be scribed such that there is an overlapping area between adjacent laser pulse spots along the line. The use of a series of laser pulses with beneficial pulse shape to scribe a line in the thin film results in a better quality and cleaner scribing process compared to that achieved with the conventional pulse shape.

24 Claims, 10 Drawing Sheets

(56) References Cited

U.S. PATENT DOCUMENTS

| | | | |
|---|---|---|---|
| 7,173,212 | B1* | 2/2007 | Semak .................... 219/121.69 |
| 7,256,930 | B2 | 8/2007 | Liu |
| 7,428,253 | B2 | 9/2008 | Murison et al. |
| 7,443,893 | B2 | 10/2008 | Murison et al. |
| 7,742,511 | B2 | 6/2010 | Murison et al. |
| 8,237,082 | B2* | 8/2012 | Beck et al. ............... 219/121.61 |
| 2005/0061789 | A1* | 3/2005 | Nagai et al. ............. 219/121.75 |
| 2005/0067388 | A1* | 3/2005 | Sun et al. ................ 219/121.61 |
| 2005/0088724 | A1 | 4/2005 | Lee et al. |
| 2005/0224111 | A1 | 10/2005 | Cunningham et al. |
| 2005/0274702 | A1 | 12/2005 | Deshi |
| 2006/0192105 | A1 | 8/2006 | Zare et al. |
| 2006/0228897 | A1 | 10/2006 | Timans |
| 2007/0062919 | A1* | 3/2007 | Hamada et al. ......... 219/121.71 |
| 2007/0272666 | A1* | 11/2007 | O'Brien et al. ......... 219/121.69 |
| 2008/0035614 | A1 | 2/2008 | Smart |
| 2009/0074019 | A1 | 3/2009 | Wong et al. |
| 2009/0165849 | A1 | 7/2009 | Chan et al. |
| 2009/0188543 | A1* | 7/2009 | Bann ........................ 219/121.69 |
| 2009/0245302 | A1* | 10/2009 | Baird et al. ..................... 372/25 |
| 2009/0323741 | A1* | 12/2009 | Deladurantaye et al. ....... 372/25 |
| 2010/0177794 | A1* | 7/2010 | Peng et al. ...................... 372/25 |
| 2011/0142084 | A1 | 6/2011 | Reid et al. |
| 2011/0162684 | A1 | 7/2011 | Kim et al. |
| 2011/0189811 | A1 | 8/2011 | Stephens et al. |
| 2011/0233177 | A1 | 9/2011 | Panarello et al. |
| 2011/0240614 | A1 | 10/2011 | Panarello et al. |

FOREIGN PATENT DOCUMENTS

| | | | |
|---|---|---|---|
| JP | 2005088053 | A | 4/2005 |
| JP | 2007503125 | A | 2/2007 |
| WO | WO 2004/107510 | | 12/2004 |
| WO | WO-2007-085516 | A1 * | 8/2007 |
| WO | WO-2008/056116 | A * | 5/2008 |

OTHER PUBLICATIONS

Matsui et al., "Generation of wavelength tunable gain-switched pulses from FP MQW lasers with external injection seeding", IEEE Photonics Technology Letters, Aug. 1997; 9(8):1087-1089.

Skeldon et al., "A High-Bandwidth Electrical-Waveform Generator Based on Aperture-Coupled Striplines for OMEGA Pulse-Shaping Application," CLEO 98. Technical Digest. Summeries of papers presented at the Conference on Lasers and Electro-Optics, 1998., May 3-8, 1998, pp. 345-356.

Zhang et al., "Turnable dual-wavelength picosecond pulse generation by the use of two Fabry-Perot laser diodes in an external injection seeding scheme", Technology Letters, Jan. 2002; 14(1):92-94.

International Search Report and Written Opinion of PCT Application No. PCT/US2010/048805, mailed Nov. 2, 2010, 8 pages total.

Bernhard Klimt, "Micromachining with Industrial Picosecond Lasers", Laser Technik Journal, No. 1, Jan. 2007, 40-43.

Dunsky et al., "Scribing thin-film solar panels", Industrial Laser Solutions for Manufacturing, Feb. 2008, 4 pages.

J.L.Offler, et al., "Depth Selective Laser Scribing for Thin-Film Silicon Solar Cells on Flexible Substrates", Photovoltaic Specialists Conference (PVSC), Jun. 7-12, 2009, 34th IEEE, 5 pages.

Jim Bovatsek et al., "Effects of Pulse Duration on the ns-Laser Pulse Induced Removal of Thin Film Materials Used in Photovoltaics", Society of Photo-Optical Instrumentation Engineers, Mar. 2009,13 pages.

Rajesh S. Patel, et al., "Why Pulse Duration Matters in Photovoltaics", Laser Technik Journal, No. 1, Jan. 4, 2010, 21-24.

SA Belozerov, et al., "Mechanism of Advanced Evaporation of Glass Under the Action of Laser Radiation", Mar. 1977,355-357.

"A Unique Laser Process For Rapid Patterning of Thin Films," Oct. 9, 2011, 4 pages, (www.Coherent.com).

"Amorphous Silicon Thin Film Solar Cell Scribing," Industrial Laser Applications Lab, No. 2, Jun. 2011, 2 pages.

"Scribing and Patterning of Transparent Conducting Oxides with a High Energy Picosecond Fiber Laser," May 2011, 2 pages. (www.fianium.com).

"Standard Thermodynamic Properties of Chemical Substances", CRC Press LLC, May 5, 2000, CRC Handbook of Chemistry and Physics, 57 pages.

"Direct Write Laser Patterning, Dry Etching and Structuring of TCO coatings on Glass & Plastic Displays at Laserod", LIA Handbook of Laser Materials Processing, May 1, 2001, 8 pages.

Becker et al., "Polymer Microfabrication Technologies for Microfluidic Systems", Anal Bioanal Chem, Nov. 8, 2007, 390:89-111.

Wang, et al., "Thickness effect on laser-induced-damage threshold of indium-tin oxide films at 1064nm," Journal of Applied Physics 110, Dec. 9, 2011, 5 pages.

Han et al., "Interaction Between Pulsed Laser and Materials", Lasers—Applications in Science and Industry, Dec. 2011, pp. 109-130.

Holl, et al., "Microfluidic Materials: Polymeric Laminate Technology", Sep. 7, 2001, 6 pages.

Bityurin, et al., "Models for Laser Ablation of Polymers," Chem. Rev. 103, Jan. 28, 2003, 519-552.

Tseng. et al., "The effect of laser patterning parameters on fluorine-doped tin oxide films deposited on glass substrates," Applied Surface Science, 257, Aug. 15, 2011, 8813-8819.

Tseng, et al., "Laser Scribing of indium tin oxide (ITO Thin Films Deposited on Various Substrates for Touch Panels," Applied Surface Science, 257, Dec. 5, 2010, 1497-1494.

Rana, Viren V. et al., "Selective Removal of Dielectric Layers Using Picosecond UV Pulses", Proc. of SPIE vol. 7193, Mar. 5, 2009, 8 pages.

Shin, Young C. et al., "High Precision Scribing of Thin Film Solar Cells by a Picosecond Laser", Proceedings of 2011 NSF engineering Research and Innovation conference Atlanta, Georgia, Jan. 4-7, 2011, 7 pages.

Batzill et al., "The surface and materials science of tin oxide", Progress in Surface Science 79, 2005, 47-154. The month of publication is not available. In accordance with MPEP 609.04 (a), the year of this publication is sufficently earlier than the effective U.S. filing date, Sep. 24, 2010, so that the particular month of publication is not an issue. See MPEP 604.04 (a).

JP Office Action in related case JP 2012-530929 dated Aug. 6, 2014, 6 pages.

* cited by examiner

METHOD AND APPARATUS TO SCRIBE A LINE IN A THIN FILM MATERIAL USING A BURST OF LASER PULSES WITH BENEFICIAL PULSE SHAPE

CROSS-REFERENCES TO RELATED APPLICATIONS

This application claims priority to U.S. Provisional Patent Application No. 61/245,582, filed on Sep. 24, 2009, entitled "Method and Apparatus to Scribe a Line in a Thin Film Material Using a Burst of Laser Pulses With Beneficial Pulse Shape," the disclosure of which is hereby incorporated by reference in its entirety for all purposes.

BACKGROUND OF THE INVENTION

The present invention relates generally to laser processing of materials. More particularly, the present invention relates to methods and apparatus employing a series of laser pulses which have been specifically shaped to provide better processing quality and higher throughput in laser processing applications. The present invention also relates to scribing of thin film materials on a substrate. However, the invention has broader applicability and can be applied to other applications and materials.

Pulsed laser sources, such as Nd:YAG lasers, have been used to perform laser-based material processing for applications such as marking, engraving, micro-machining, cutting, and scribing. One such process where lasers are commonly used is scribing lines in a thin film of material on a thicker substrate. A thin film is defined in very general terms as a layer of material which is only a few molecules thick. In practice, a thin film is typically between 25 nm and 2 microns in thickness. A substrate is a material upon which the thin film is deposited and typically the substrate is substantially thicker than the thin film. There are many examples of the use of thin films in areas such as electronic devices, electro-optical devices, optical devices, and corrosion protection. For example, photovoltaic or solar cells can have thin films of amorphous silicon, cadmium telluride, copper indium diselenide, copper indium gallium diselenide, or molydenum, and electrodes made using thin films of transparent conductive oxide (TCO) material such as indium tin oxide (ITO), zinc oxide (ZnO) and oxides of other metals such as aluminum or molybdenum. Thin films of these and other materials are also used in flat panel displays and digital displays.

Scribing a line in a thin film material on a thicker substrate means to remove all the thin film material down to the substrate and do this along a line. For relatively thick lines, a knife can be used but it often results in rough edges and incomplete removal of the thin film material. The width of the line required in electronic devices can be very thin. Lasers are used for the application of scribing lines in thin film materials because they can be used to cut a very thin line and cleanly ablate the thin film material.

When scribing TCO, one parameter that is monitored is the resistivity achieved across the scribed line. The resistivity is affected by the amount of TCO material which is removed in the scribing process and the goal therefore is to remove all the TCO material in the groove being cut. One issue can be the amount of residue and debris which is generated in the cutting process. Ablated TCO material can fall across the groove as it is being scribed and thereby reduce the resistivity. Even if this does not happen immediately, the presence of debris can result in a reduction in resistivity sometime later if the debris is swept into the groove. A goal of the manufacturing process is to minimize the amount of residue and debris. For this reason, laser scribing often takes place with the beam passing through the glass substrate so that it is a "second-surface" process; although this helps to reduce the amount of residue and debris which sticks to the surface, some residue and debris remains. A typical acceptable value of resistivity is 200 MegaOhm although the ideal value depends on the application.

Another issue which does affect the quality of the laser scribing process is the generation of micro-cracks in the glass substrate or in the walls of the TCO material in the scribed groove. Over time, micro-cracks can propagate and become bigger with the result that mechanical flaws can appear at or across the scribed groove. Such occurrences are to be avoided since they can lead to device failure at some time after the standard "infant mortality" test phase and are thus difficult to counteract. Any physical deterioration of the thin film or the substrate by the laser pulse must be minimized. If present, micro-cracks and residue and debris can be observed using a high power optical microscope.

Depending on the application and the materials to be processed, it can be advantageous to be able to select the various characteristics of the laser pulses, including pulse energy, pulse width, pulse repetition rate, peak power or energy, and pulse shape, as appropriate to the particular application. Many examples exist of the careful control of pulse energy and power to optimize various materials processing applications.

Many existing high power pulsed lasers that are characterized by pulse energies greater than 0.5 mJ per pulse, rely on techniques such as Q-switching and mode locking to generate optical pulses. However, such lasers produce optical pulses with characteristics that are predetermined by the cavity geometry, the mirror reflectivities, and the like. Using such lasers, it is generally difficult to achieve an optimal pulse shape for the application at hand and therefore in many cases the laser processing has some deficiencies.

Therefore, what is needed is a system and method for scribing thin films of materials that improve the quality and the yield of the thin film scribing process.

SUMMARY OF THE INVENTION

The present invention relates to a method to scribe or cut a line in a thin film layer of material on a substrate using a burst of laser pulses shown schematically in FIG. 1a and consisting of individual pulses with a beneficially-formed temporal pulse shape, the use of which pulse shape instead of the conventional temporal pulse shape emitted by a laser has various advantages to improve the quality and the yield of the thin film scribing process. In one embodiment, the beneficially-shaped pulse can be described generally as a chair shape power temporal profile: an initial power spike followed by a significantly longer but lower-power plateau as shown schematically in FIG. 1b. In the scribing process where multiple pulses of the focused laser beam spot are scanned across a thin film material with some spot overlap, if a beneficially-shaped pulse of this general form is used instead of the conventional temporal pulse shape previously used, significant improvements in the quality of the scribing process are achieved. More specifically, the pulse length (FWHM full width half maximum) of each pulse in the burst of pulses is between 1 ns and 200 ns, and the pulse length FWHM of the spike is more than 0.3 ns but less than 30% of the pulse length of the full pulse. The peak power of the spike is between 1.5 times to 10 times the average peak power of the total pulse.

In another embodiment, the scribing process uses a burst of laser pulses shown schematically in FIG. 2a whereby each pulse has a beneficially-shaped pulse shape which can be described as a simple square-top pulse shape with a rapidly-rising leading edge as shown schematically in FIG. 2b. In the scribing process where multiple pulses of the focused laser beam spot are scanned across a thin film material with some spot overlap, if a beneficially-shaped pulse of this square top form is used instead of the conventional temporal pulse shape previously used, improvements in the quality of the scribing process are achieved. More specifically, the pulse length (FWHM full width half maximum) of the square pulse is between 1 ns and 200 ns.

The use of beneficial pulse shapes in the thin film scribing process has a number of advantages. For example, for laser scribing of zinc oxide thin films on a glass substrate which is a commonly-used material in solar panels, the use of the square temporal pulse shape results in no micro-cracks being generated in the glass substrate compared to the situation when a conventional laser temporal pulse shape is used which does result in significant micro-cracking in the substrate. On the same material, the use of the spike/plateau chair laser pulse shape results in no micro-cracks being generated in either the glass substrate or the scribed edges of the ZnO material compared to the situation when a conventional laser temporal pulse shape is used which results in significant micro-cracking in the glass substrate and on the scribed edges of the ZnO material. In addition, the use of the spike/plateau chair laser pulse shape also results in a significant reduction in the generation of ZnO residue and debris at the scribed line. The use of beneficial pulse shapes provides a significant improvement in the quality of the devices generated thereby and also a significant improvement in the yield as the number of devices which are acceptable to advance into the next stage of manufacturing is increased.

Most lasers are designed to provide maximum average power or pulse energy or repetition frequency and little consideration is given to the shape of the output pulse. The conventional temporal pulse shape of a free running, Q-switched or mode-locked laser as shown schematically in FIG. 3 has a rising leading edge, a rounded top and a falling edge which falls gradually. This pulse shape is determined primarily by the laser gain medium, the laser pumping means and the cavity design. However, it is possible to control the output pulse shapes of some laser systems. Pulsed laser sources such as diode lasers can be pulsed in a simple manner by providing a pulsed electronic drive signal. The pulse shape of the optical laser pulse thus generated can be pre-determined by choosing the shape of the electronic drive signal to the diode laser. The shaped signal from such a pulsed laser source can then be amplified in a laser amplifier such as a fiber laser amplifier. In one embodiment of the present invention, an oscillator amplifier laser system of this design is provided to generate a series of laser pulses with beneficially-shaped temporal pulse shapes suitable for scribing thin film materials.

In another embodiment, a more sophisticated laser system is provided to generate a series of laser pulses with beneficially-shaped temporal pulse shapes. U.S. patent application Ser. No. 12/210,028 titled "Method and system for a Pulsed Laser Source Emitting Shaped Optical Waveforms" filed Sep. 12, 2008, describes examples of tunable pulsed laser sources. The pulsed laser source includes a seed source adapted to generate a seed signal and an optical circulator having a first port coupled to the seed source, a second port, and a third port. The pulsed laser source also includes a modulator driver adapted to produce a shaped electrical waveform and an amplitude modulator coupled to the modulator driver and adapted to receive the shaped electrical waveform. The amplitude modulator is characterized by a first side coupled to the second port of the optical circulator and a second side. The pulsed laser source further includes a first optical amplifier characterized by an input end and a reflective end. The input end is coupled to the second side of the amplitude modulator. Moreover, the pulsed laser source includes a second optical amplifier coupled to the third port of the optical circulator. U.S. Pat. No. 7,428,253 titled "Method and System for Pulsed Laser Source with Shaped Optical Waveforms" issued Sep. 27, 2008 also describes examples of tunable pulsed laser sources.

In yet another embodiment, another laser design is provided to generate a series of laser pulses with beneficially-shaped temporal pulse shapes. U.S. Provisional Application No. 61/186,317, describes examples of stable pulsed laser sources. The pulsed laser source includes a stabilizing source adapted to generate stabilizing optical radiation, and an optical circulator having a first port coupled to the stabilizing source, a second port, and a third port. The pulsed laser source also includes a signal source adapted to produce a signal pulse of desired shape wherein the signal source is coupled to the second port of the optical circulator. The pulsed laser source further includes an optical amplifier coupled to the third port of the optical circulator. U.S. patent application Ser. No. 12/210,028, U.S. Pat. No. 7,428,253, and U.S. Provisional Application No. 61/186,317 are hereby incorporated by reference in their entirety for all purposes.

There are a number of designs which can be used to provide the beneficially-shaped temporal pulse shapes as desired. In a further embodiment of this invention, a materials processing system is disclosed to scribe or cut lines in a layer or layers of thin film materials on a substrate. The system includes a laser which provides a beneficially-shaped temporal pulse shape or shapes to optimally process thin film materials so as to achieve one or more of the following benefits; (1) to reduce or exclude the formation of microcracks in the substrate, (2) to reduce or exclude the formation of microcracks along the edges of the thin film cut region, (3) to reduce debris formation, and (4) to reduce surface area residue. As well as the laser, the materials processing system includes means to focus, image and scan the laser beam in a line across the thin film material so as to perform the scribing process, means to adjust the overlap of the scanned laser spot, and a computer to control the process. In a related embodiment, the materials processing system may also include means to change the wavelength of the laser using the process of harmonic generation.

Numerous benefits are achieved using the present invention over conventional techniques. For example, in an embodiment according to the present invention, high power, pulsed lasers suitable for laser scribing of thin film materials are provided that utilize a compact architecture that is inexpensive in comparison to lasers with comparable performance characteristics. Furthermore, in an embodiment according to the present invention, pulsed lasers suitable for laser scribing of thin film materials are provided such that the optical pulses can be shaped to optimize the laser pulse profile for said scribing of thin film materials. Depending upon the embodiment, numerous benefits exist including for example improvements in quality and yield of the processed items. These and other benefits have been described throughout the present specification and more particularly below. Various additional objects, features and advantages of the present invention can be more fully appreciated with reference to the detailed description and accompanying drawings that follow.

DETAILED DESCRIPTION OF THE INVENTION

In the manufacturing process of solar cells, flat panel displays, and digital displays, a thin film of a transparent conducting oxide (TCO) material deposited on a glass substrate must be segmented by scribing lines in the TCO material, thereby segmenting to provide electrical isolation between the TCO segment on one side of the line and the TCO segment on the other side of the line. Scribing a line using a pulsed laser is a multiple pulse process using a burst of many laser pulses whereby each pulse is focused to a spot on the thin film and the spot is scanned along the desired line to be scribed such that there is some overlap between each spot with the previous spot and the following spot. The width of the scribed line is determined primarily by the size of the focused laser spot. Widths for lines are scribed in a ZnO thin film on a glass substrate range from 10 microns to 100 microns although even thinner lines can be achieved. A certain amount of spot overlap is used to adequately remove the TCO material to leave a clean line on the substrate. Thus, the scribing process is essentially a multiple pulse process rather than a single pulse process. The amount of overlap from pulse to pulse can be used to control the scribing process. For example, the thicker the thin film, then the more overlap can be used. In one example the pulse overlap is 30% although that value can vary from as low as 10% to as much as 95% depending on the properties of the material being processed.

Figure 4:
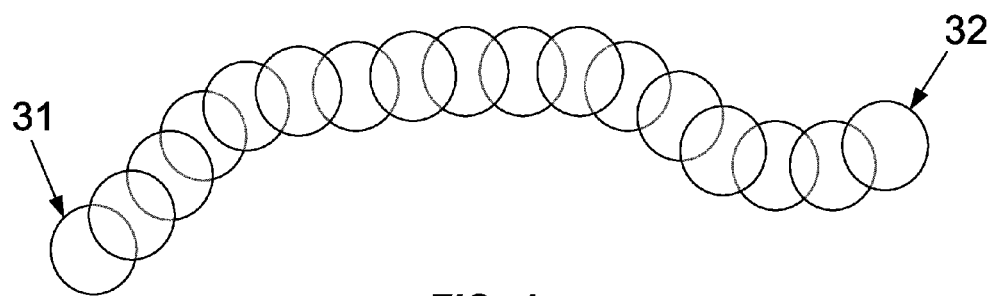
FIG. 4 is a schematic diagram showing the top view through the substrate of the laser scribing process in a thin film material using multiple laser pulses such that the processed area of each pulse overlaps the area processed by the previous pulse and also the next pulse. In this particular diagram, the spot overlap is approximately 30% but the value of spot overlap chosen for the process can range between 10% and 95%.

A schematic representation of laser scribing of a thin film is shown in FIG. 4. Although the scribing process is commonly a second-surface process, where the laser beam first passes through the substrate to access the thin film, it is also possible for the laser to be used to scribe the thin film directly without passing through the substrate. Laser scribing of thin films is a multiple pulse process requiring a burst of laser pulses including at least 10 pulses. Each pulse is focused or imaged to a spot at the thin film material. The first pulse 31 in the burst is directed so that the first spot is at the start position of the line to be scribed. Each subsequent pulse in the burst is directed to a spot which is adjacent to the previous spot but with some overlap value OL % between 10% and 95%. The value of spot overlap shown in FIG. 4 is about 30%. Thus, each pulse in the burst of pulses is directed to a position along the line to be scribed and the final pulse 32 is directed so that the spot from the final pulse is at the end of the line to be scribed. If N is the number of pulses in the burst, d is the diameter of the focused spot at the thin film, and OL % is the overlap value in percent, then the length L of the line which is scribed is given by the formula:

$$L = dN - d(N-1)(OL\%)/100$$

The width of the scribed line is a function of the focused spot size, the spot overlap, and the interaction with the thin film; ideally, the width of the scribed line is approximately the same as the diameter of the focused spot. The choice of spot overlap is a processing parameter which is changed to optimize the process. For thin materials, it is often possible to use a very low spot overlap such as 10% which provides a fast scribing speed up to 1 msec for example. For thicker materials, a larger overlap is usually chosen so that the thin film material is removed cleanly.

Figure 5A:
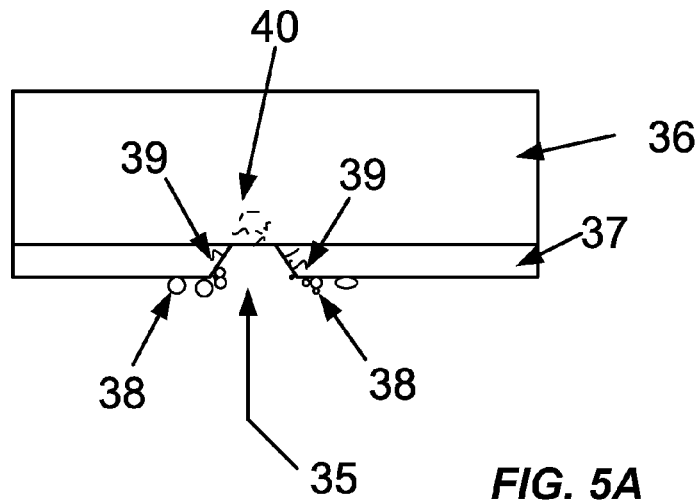
FIG. 5a is a schematic diagram showing a cross sectional side view of a single thin film material 37 deposited on a substrate 36 and with a groove 35 scribed in the thin film. Also shown are micro-cracking 40 of the substrate, micro-cracking 39 of the edges of the scribed thin film, and residue and debris 38 from the ablated thin film material which may adhere to the surface. Such micro-cracking and residue and debris is often the result of using a conventional laser pulse shape when laser scribing the thin film material.

FIG. 5a is a schematic diagram showing the side view of a single thin film material 37 deposited on a substrate 36 and with a groove 35 scribed in the thin film. Also shown are micro-cracking 40 of the substrate, micro-cracking 39 of the edges of the cut thin film, and residue and debris 38 from the ablated thin film material which may adhere to the surface. Such micro-cracking and residue and debris is often the result of using a conventional laser pulse shape such as that shown schematically in FIG. 3 when laser scribing the thin film material. It is an object of this invention to provide a method and an apparatus to improve the quality of thin film scribing by reducing or eliminating micro-cracking and residue and debris formation.

Figure 1A:
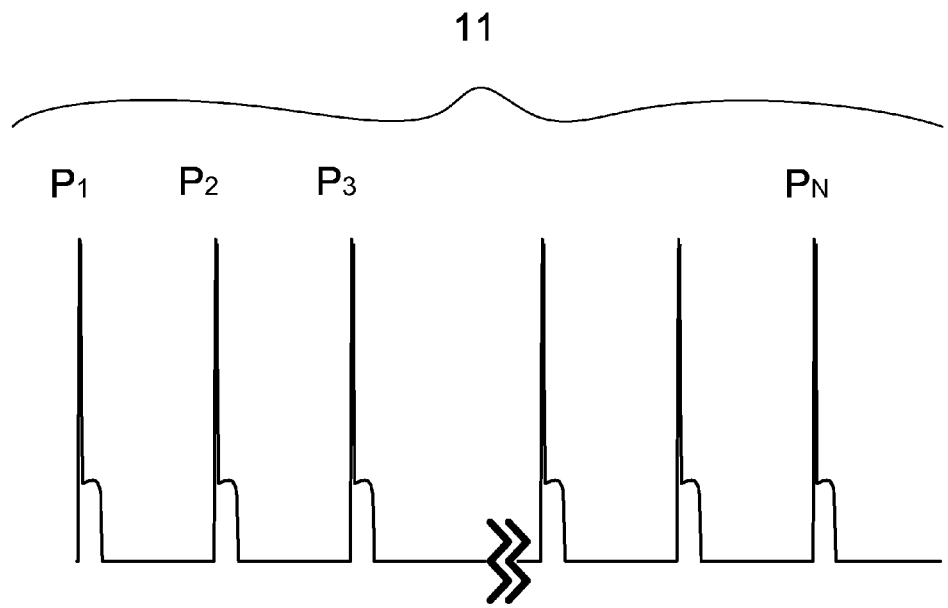
FIG. 1a is a schematic diagram of an embodiment showing a burst of pulses, with a beneficially-shaped pulse shape of the chair pulse format, suitable for scribing a line in a thin film material on a substrate. In this figure, time is on the horizontal axis and power is along the vertical axis.
Figure 2A:
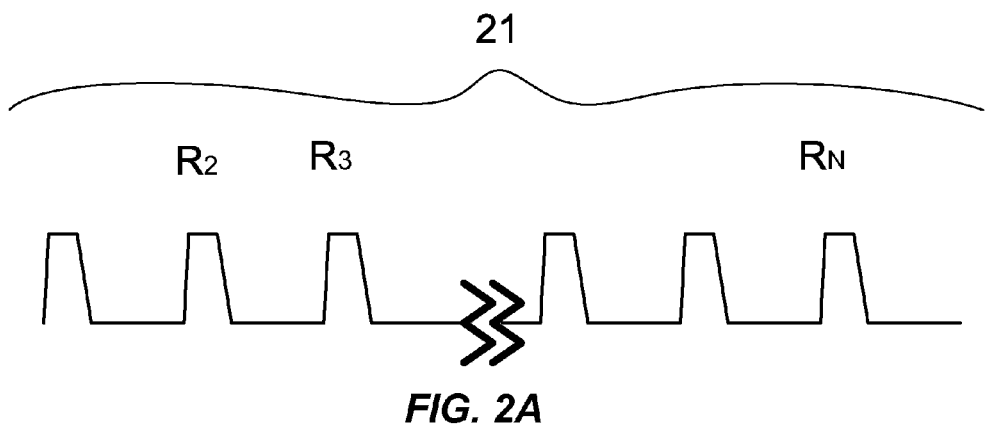
FIG. 2a is a schematic diagram of an embodiment showing a burst of pulses, with a beneficially-shaped pulse shape of the square pulse format, suitable for scribing a line in a thin film material on a substrate.
Figure 2B:
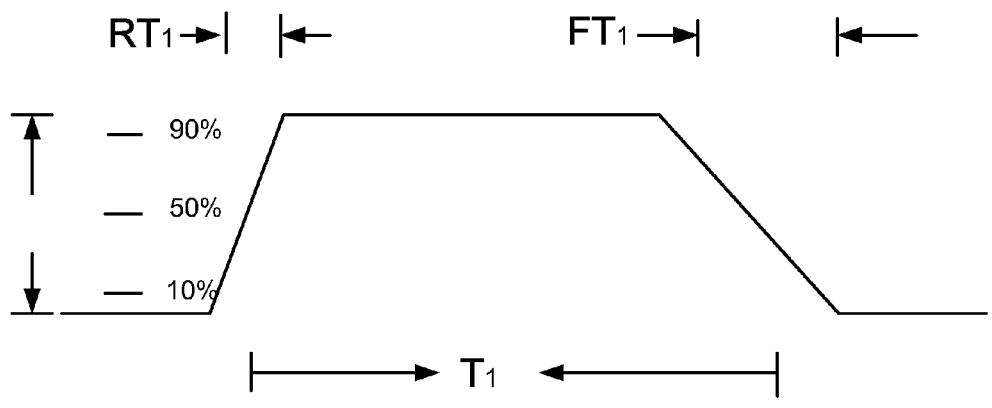
FIG. 2b a shows a flat-topped square pulse, where time is on the horizontal axis and power is along the vertical axis.
Figure 2C:
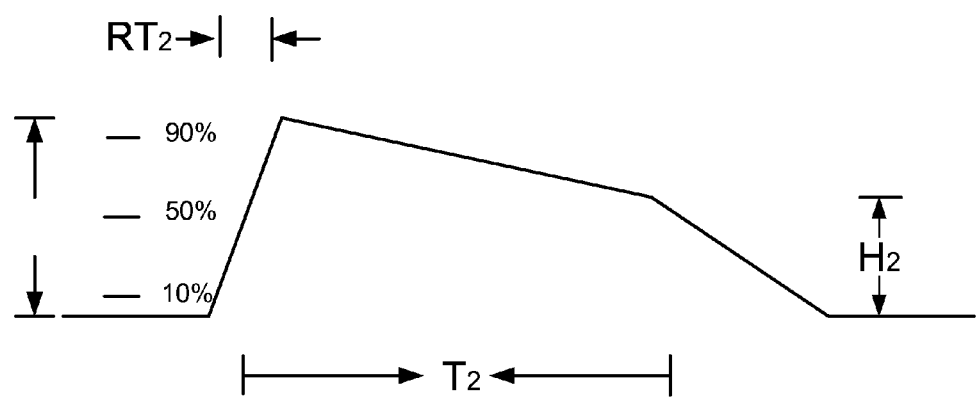
FIG. 2c shows a square pulse with droop where time is on the horizontal axis and power is along the vertical axis.
Figure 3:
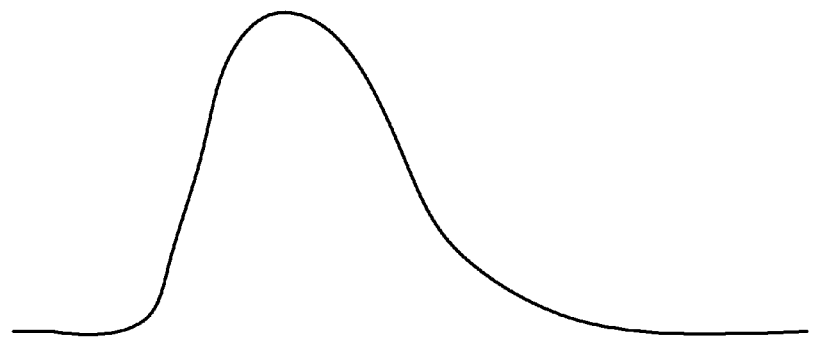
FIG. 3 is a schematic diagram showing temporal pulse shapes for conventional laser pulses used for scribing thin film materials on a substrate. In this figure, time is on the horizontal axis and power is along the vertical axis.
Figure 5B:
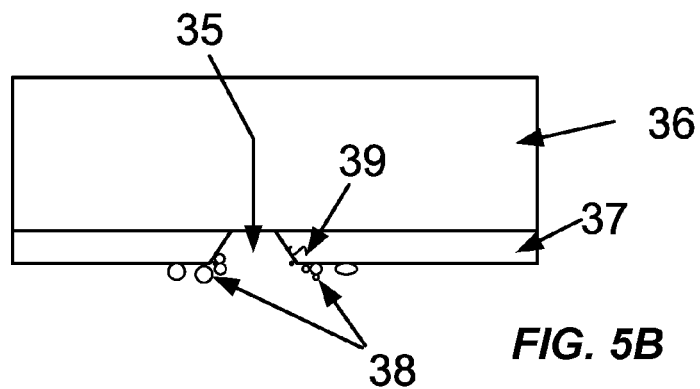
FIG. 5b is a schematic diagram showing a cross sectional side view of the structure shown in FIG. 5a, but without micro-cracking in the substrate and a reduction of micro-cracking of the edge of the scribed thin film, obtained using another embodiment of this invention.

FIGS. 1a and 2b show bursts of pulses 11 and 21 respectively with various beneficial pulse shapes according to embodiments of the invention that have improved the quality of scribing a line in a thin film on a glass substrate compared to the lesser quality obtained using bursts of laser pulses with a conventional pulse shape shown in FIG. 3 to do the same process. Each burst contains at least 10 pulses. In particular, FIG. 2a shows a burst of pulses according to one embodiment of this invention. FIG. 2b shows a beneficial pulse shape according to one embodiment of the invention with a pulse length FWHM of T1, front edge risetime (10% to 90%) of RT1, and a back edge falltime (90% to 10%) of FT1. The peak power of the flat top is H1. Compared to the lines scribed using bursts of pulses with conventional pulse shape which showed significant micro-cracking of the glass substrate and the edge of the ZnO scribe as shown in FIG. 5a, the lines scribed using burst of pulses of the square pulse shape of FIG. 2b show no micro-cracking in the glass substrate and a reduction in the micro-cracks in the edge of the ZnO scribed region as shown schematically in FIG. 5b. In one embodiment of the invention, lines of width 54 microns scribed in a ZnO film of thickness 450 nm on a glass substrate of thickness 6 mm using bursts of pulses from a laser of wavelength 1064 nm with a pulse shape of FIG. 2b, with pulse energy of 135 microJoules, a spot size of 50 microns, a pulse length of 50 ns, values of RT1 and FT1 of 1 ns, repetition rate 36,000 pulses per second, and various values of spot overlap (including 10%, 25% and 50% overlap) show no micro-cracking of the substrate. In addition, the efficiency of the scribing process increases as the width of the material removed increases from 44 microns with the conventional pulse shape to 54 microns for the square pulse shape with the same pulse energy. Changing the pulse shape to a square pulse shape does provide a definite increase in the width of the scribed line and also effectively prevents the formation of micro-cracking in the glass substrate. The specific parameters of an embodiment according to this invention are not restricted to these values, however. In one embodiment, the pulse length T1 of the square pulse would be between 1 ns and 200 ns. The risetime RT1 of the square pulse would be more than 0.3 ns but less than 10% of the pulse length T1. The falltime FT1 would be less than 30% of the pulse length T1. Similar improvements would also be achieved even if the square pulse shape had some droop as shown in FIG. 2c as long as the droop was such that H1-H2 was less than 50% of H1.

Similar improvements will be achieved using different values of spot size and scribing speed. For example, similar improvements in the quality when scribing a line of width 25 microns were observed using a laser with pulse energy 42 microJoules operating at 72,000 pulses per second focused to a 25 micron spot size, with various values of spot overlap (including 10%, 25% and 50% overlap). Likewise, similar improvements in the quality of the ZnO scribing were observed using a laser with pulse energy 7 microJoules operating at 260,000 pulses per second focused to a 10 micron spot, and various values of spot overlap (including 10%, 25% and 50% overlap). In all cases, the use of a square-topped pulse as described herein results in the above-noted improvements in scribing quality.

For very thin films, a small overlap can be used to remove the material at each focused spot, but as the thickness of the material increases it can be better to increase the spot overlap rather than increase the pulse energy. Low spot overlap can lead to more modulation in the edge of the scribed line where the spots overlap than in the edges of the scribed line if the spot overlap is high. However, this sharp point at the edge of each spot overlap is not the same as the micro-cracking seen at a thin film edge. Therefore, in one embodiment, the sharp edge where spots overlap is reduced, without affecting micro-cracking for either of the pulse shapes, by increasing the spot overlap.

Figure 1B:
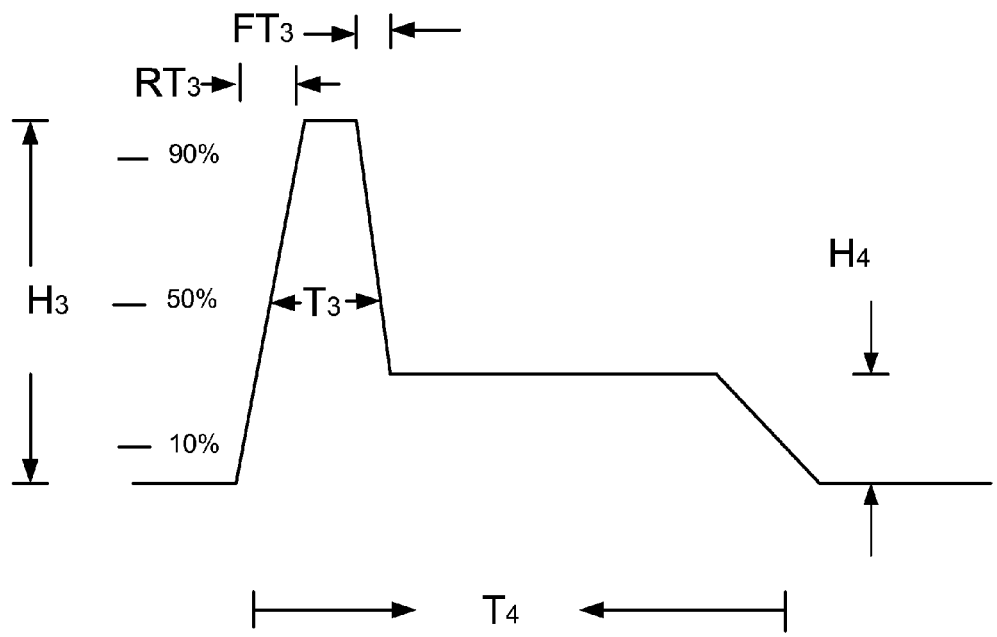
FIG. 1b shows an embodiment of a spike/plateau chair pulse shape.
Figure 1C:
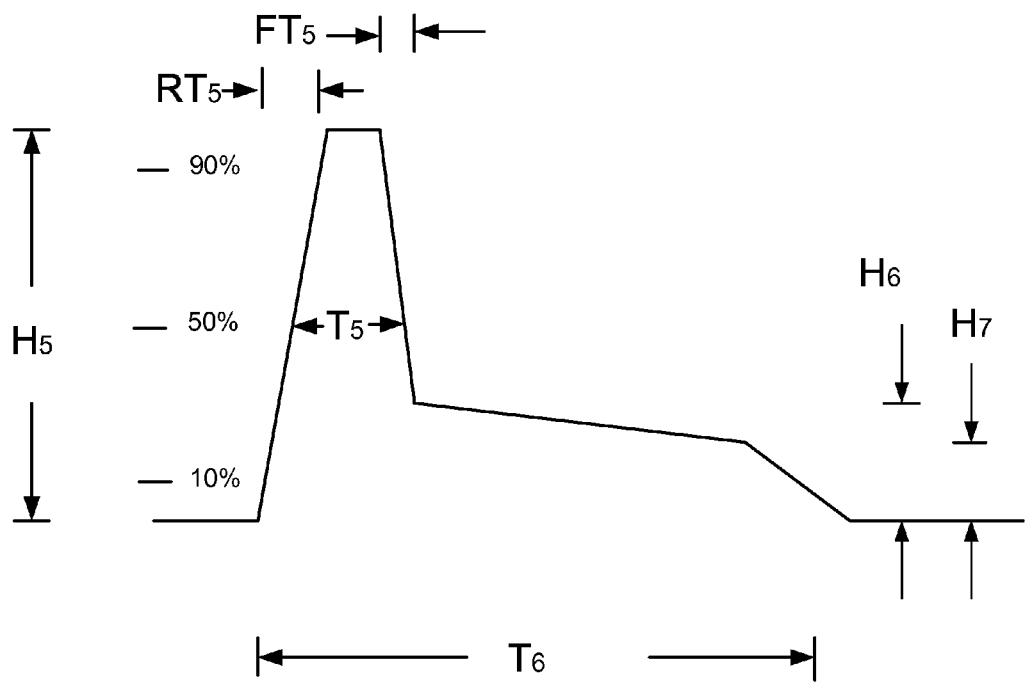
FIG. 1c shows the embodiment of a spike/plateau chair pulse with droop.
Figure 1D:
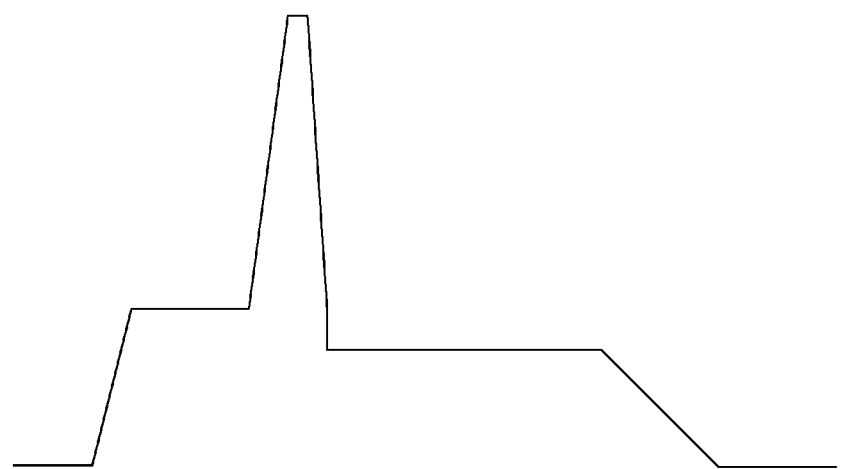
FIG. 1d shows another embodiment of a chair pulse shape.
Figure 1E:
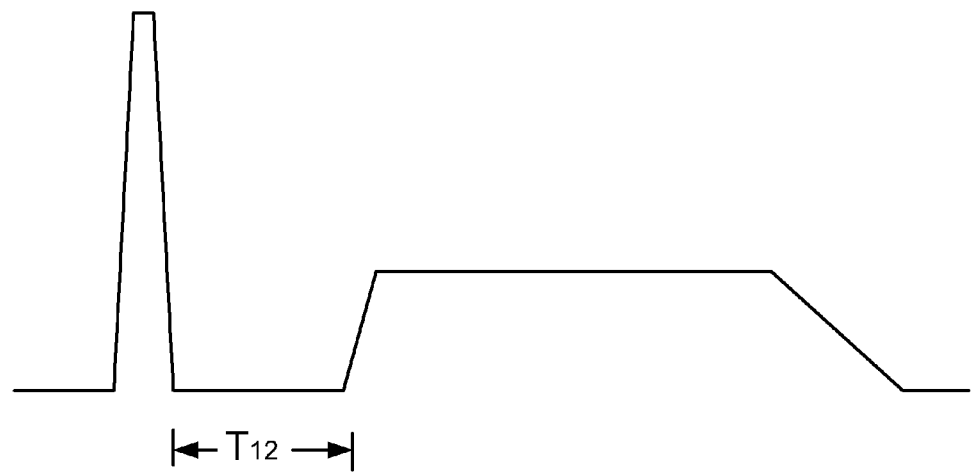
FIG. 1e shows a further embodiment of the chair pulse shape.
Figure 5C:
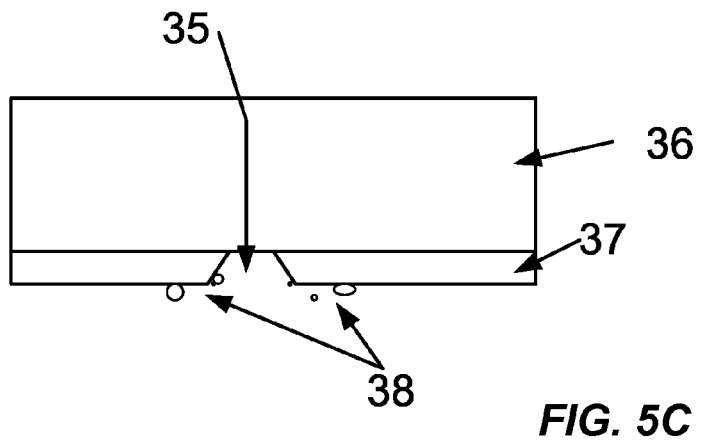
FIG. 5c is a schematic diagram showing a cross sectional side view of the structure shown in FIG. 5a, but without micro-cracking in both the substrate and the edge of the scribed thin film and also a reduction in the amount of residue and debris, obtained using another embodiment of the invention.

In another embodiment of the present invention, a burst of laser pulses as shown schematically in FIG. 1a is used to etch a thin film material. Each burst of pulses includes at least 10 pulses. In an embodiment, each pulse in the burst of pulses has a beneficial pulse shape shown schematically in FIG. 1b described as the spike/plateau chair pulse shape. In FIG. 1b, a pulse shape consists of two regions: an initial spike with peak power H3, risetime RT3 and width FWHM T3, and a flat plateau with peak power H4 and falltime FT4. The total pulse length at 10% peak power is T4. Compared to the lines scribed in a ZnO thin film using bursts of pulses with conventional pulse shape of FIG. 3 which show significant micro-cracking of the glass substrate and the edge of the ZnO scribe as shown in FIG. 5a, the lines scribed using a burst of pulses having chair pulse shape of FIG. 1b show no micro-cracking in the glass substrate and no micro-cracking in the edge of the ZnO scribed region as shown in FIG. 5c. In addition, there is an increase in the efficiency of the scribing process as the scribed lines are wider in a similar manner to that described earlier for the square pulse shape. For the chair pulse shape of FIG. 1b, there is also a significant reduction in ZnO residue and debris generated in the scribing process compared to that observed when the conventional pulse shape of FIG. 3 is used. Specific parameters to scribe a line of width 54 microns in a thin film ZnO layer of thickness 450 nm on a glass substrate of thickness 6 mm using a burst of laser pulses according to an embodiment of this invention with the pulse shape of FIG. 1b are laser wavelength 1064 nm, pulse energy 135 microJoules, repetition rate 36,000 pulses per second, spot size 50 microns, pulse length T4 of 50 ns, risetime RT3 of 1 ns, falltime FT3 of 1 ns, spike pulse length T3 of 10 ns, the ratio of power H3/H4 to be 3:1, and various values of spot overlap (including 10%, 25% and 50% overlap). Scribing speeds higher than 1 msec may be achieved. The specific parameters of an embodiment according to this invention are not restricted to these values, however. In one embodiment, the pulse length T4 would be between 1 ns and 200 ns, and the pulse length T3 of the spike would be more than 0.3 ns and less than 30% of T4. The risetime RT3 would be more than 0.1 ns and less than 30% of T3, and the ratio H3/H4 would be greater than 1.5 but less than 10. The spot overlap would be between 10% and 95%.

Similar improvements will be achieved using different values of spot size and scribing speed. For example, similar improvements in the quality of the ZnO scribing were observed using a laser with pulse energy 34 microJoules operating at 72,000 pulses per second focused to a 25 micron spot size with various values of spot overlap (including 10%, 25% and 50% overlap). Likewise, similar improvements in the quality of the ZnO scribing were observed using a laser with pulse energy 4 microJoules operating at 260,000 pulses per second focused to a 10 micron spot and with various values of spot overlap (including 10%, 25% and 50%). In all cases, the use of a chair-shaped pulse as described herein results in the above-noted improvements in scribing quality.

As shown in FIG. 1, there are other variants of the chair pulse shape which would provide some benefits in the quality of thin film scribing process. For example, a spike/plateau shaped pulse with droop like that shown in FIG. 1c would be expected to provide significant benefits as long as H6-H7 is less than 50% of H6. It would also be possible to use a pulse shape with the spike on the middle of the plateau as shown in FIG. 1d or a pulse shape with the spike displaced by a time T12 from the plateau as shown in FIG. 1e. In one embodiment a value T12 less than 5 ns is used when scribing a line in a ZnO thin film on a glass substrate. The embodiments described in this application do not necessarily encompass all possibilities to form beneficial pulse shapes in a burst of laser pulses to optimize the scribing of a line in a thin film of ZnO to thereby improve the quality and yield of the process over that which can be achieved using a laser with a conventional pulse shape. One with ordinary skill in the art would recognize many variations, modifications, and alternatives.

The application of embodiments of this invention is not restricted to ZnO thin films or TCO thin films. The use of beneficial pulse shapes according to embodiments disclosed in this invention will be of benefit in scribing thin films of many materials. And, the use of beneficial pulse shapes in this application will benefit from the use of other wavelengths than 1064 nm as appropriate for the thin film material to be scribed. The choice of laser wavelength is determined in part by the absorption of the material to be ablated. As well as 1064 nm, lasers are available at many other wavelengths including 1032 nm, 1.3 microns, 1.5 microns, 2 microns and others. In addition, it is possible to achieve other wavelengths as required using nonlinear processes such as harmonic generation; in this case, a laser operating at 1064 nm can have the wavelength changed to 532 nm (green), 354 nm (near ultraviolet), 266 nm (ultraviolet) and so on. In some cases if the absorption is high at a shorter wavelength such as green or ultraviolet, the scribing process of a very thin film as herein described may benefit from the use of a harmonic wavelength.

The substrate of the thin film material is not restricted to glass. Another common substrate material is a polymer or plastic. In the case of scribing a film on the second surface of the substrate where the laser beam must pass through the substrate, the choice of laser wavelength is restricted to one for which the substrate is substantially transparent. However, the use of beneficial pulse shapes according to embodiments disclosed in this invention is not restricted to second surface scribing of thin film. The application of beneficial pulse shapes will be of equivalent benefit when scribing thin films directly without passing through the substrate.

Figure 6:
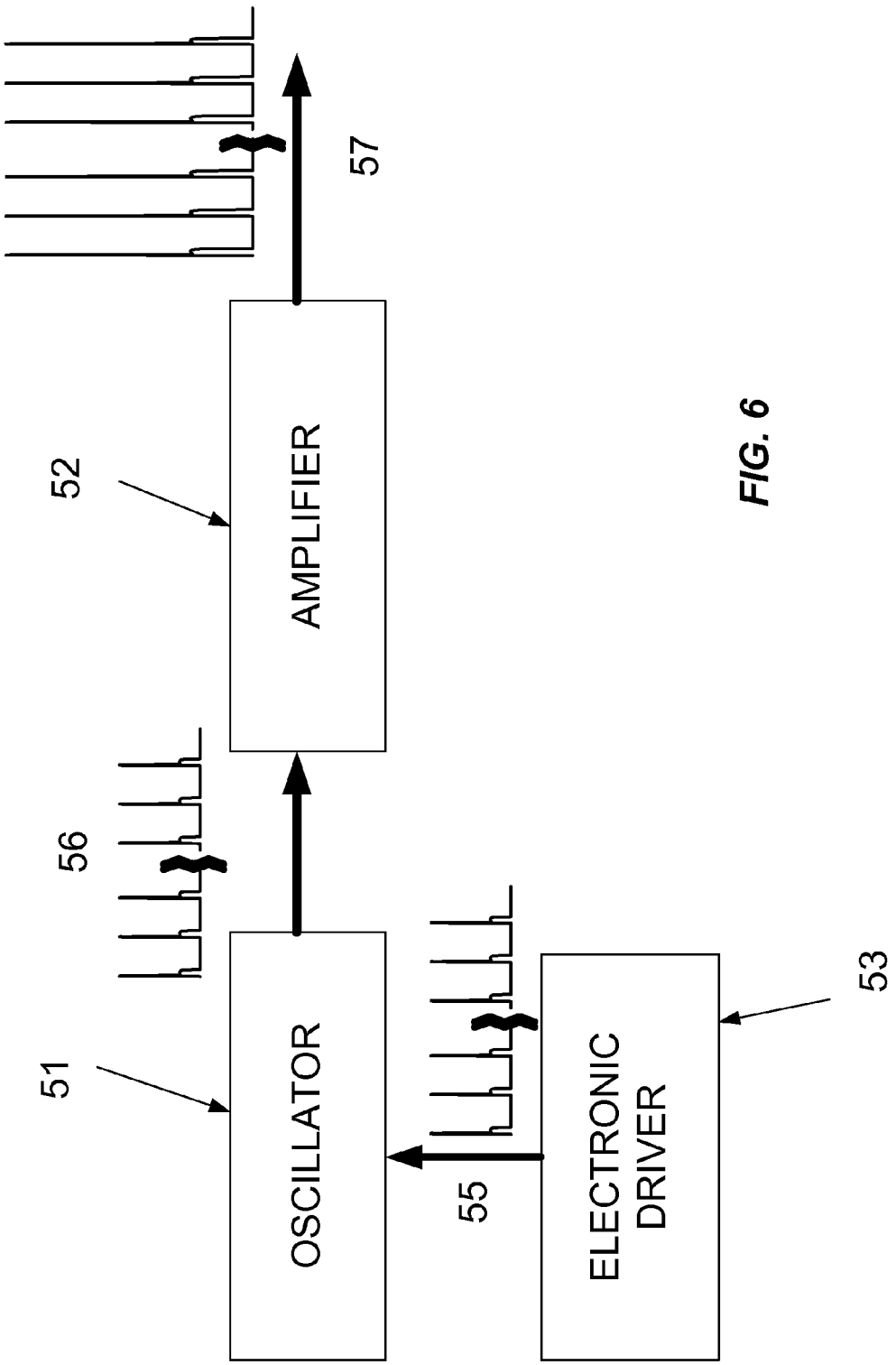
FIG. 6 is a simplified schematic illustration of a pulsed laser with tunable pulse characteristics providing an output burst of laser pulses with a beneficial pulse shape according to an embodiment of the present invention.

With reference to FIG. 6, a laser system capable of generating beneficial pulse shapes of the kind disclosed in this application is shown. This laser system includes an oscillator 51, powered by an electronic driver 53, and includes an amplifier 52. Pulsed laser sources such as diode lasers can be pulsed in a simple manner by providing a pulsed electronic drive signal. The pulse shape of each optical laser pulse in a burst 56 of pulses that is generated can be pre-determined by choosing the shape of the electronic drive signal 55 sent to the oscillator 51 by the electronic driver 53. The shaped signal from such a pulsed laser oscillator is then amplified in a laser amplifier such as a diode-pumped solid state rod laser or a fiber laser amplifier in such a manner that the pulse shape of each pulse in a burst 57 of output pulses is maintained substantially unchanged from that pulse shape provided by the oscillator.

The oscillator laser may consist of a semiconductor laser, a fiber laser, a diode laser, or a distributed feedback diode laser. In a particular embodiment, the pulsed signal source is a semiconductor diode laser operating at a wavelength of 1064 nm with a one watt peak pulse power, a repetition rate variable up to 500 KHz (kilohertz), a pulse width of 100 nanoseconds with a sub-nanosecond pulse risetime. In alternate embodiments, the peak optical power of the pulsed signal source can be lower or higher than one watt. For example, it can be 500 mW, 1 Watt, 2 Watts, 3 Watts, 4 Watts, 5 Watts or more. Also, the pulse width can be smaller or larger than 100 nanoseconds. For example, it can be 1 ns (nanosecond), 2 ns, 10 ns, 20 ns, 50 ns, 200 ns, 500 ns or more. In alternate embodiments, the optical pulse can be more complex and can comprise a beneficially-shaped pulse such as the square pulses of FIG. 4 or the chair-shaped pulses of FIG. 5. The oscillator laser is driven by an electronic driver such that the shape of the current pulse provided by the electronic driver is mimicked by the shape of the oscillator laser output pulse shape.

The output from the oscillator 51 is amplified in a laser amplifier module 52 consisting for example of a fiber laser amplifier or a diode-pumped solid state rod laser amplifier. In one embodiment of the present invention, the amplifier is an optical amplifier, including a pump that is coupled to a rare-earth-doped fiber loop through an optical coupler. Generally, a semiconductor pump laser is used as a pump, although pumping of optical amplifiers can be achieved by other means as will be evident to one of skill in the art. In a particular embodiment, optical amplifier includes a 5 meter length of rare-earth doped fiber, having a core diameter of approximately 4.8 microns and is doped with Ytterbium to a doping density of approximately $6 \times 10^{24}$ ions/m3. The amplifier also includes a pump, which is an FBG-stabilized semiconductor laser diode operating at a wavelength of 976 nm, and having an output power of 500 mW. In another particular embodiment, the optical amplifier 160 includes a 2 meter length of rare-earth doped fiber, having a core diameter of approximately 10 microns, and is doped with Ytterbium to a doping density of approximately $1 \times 10^{26}$ ions/m3. The amplifier can also include a pump which is a semiconductor laser diode having an output power of 5 W.

Although the example was given for a Ytterbium-doped fiber amplifier and a laser wavelength of 1064 nm, other examples of diode lasers, solid state lasers, and doped fibers operating at 1064 nm or operating at other wavelengths could be used in other embodiments of the present invention. These include for example erbium-doped fiber in the wavelength region 1550 nm and thulium-doped fiber in the wavelength region 2 to 3 microns. In alternative embodiments, multiple optical amplifiers are utilized downstream of the optical circulator 120 as appropriate to the particular applications.

Figure 7:
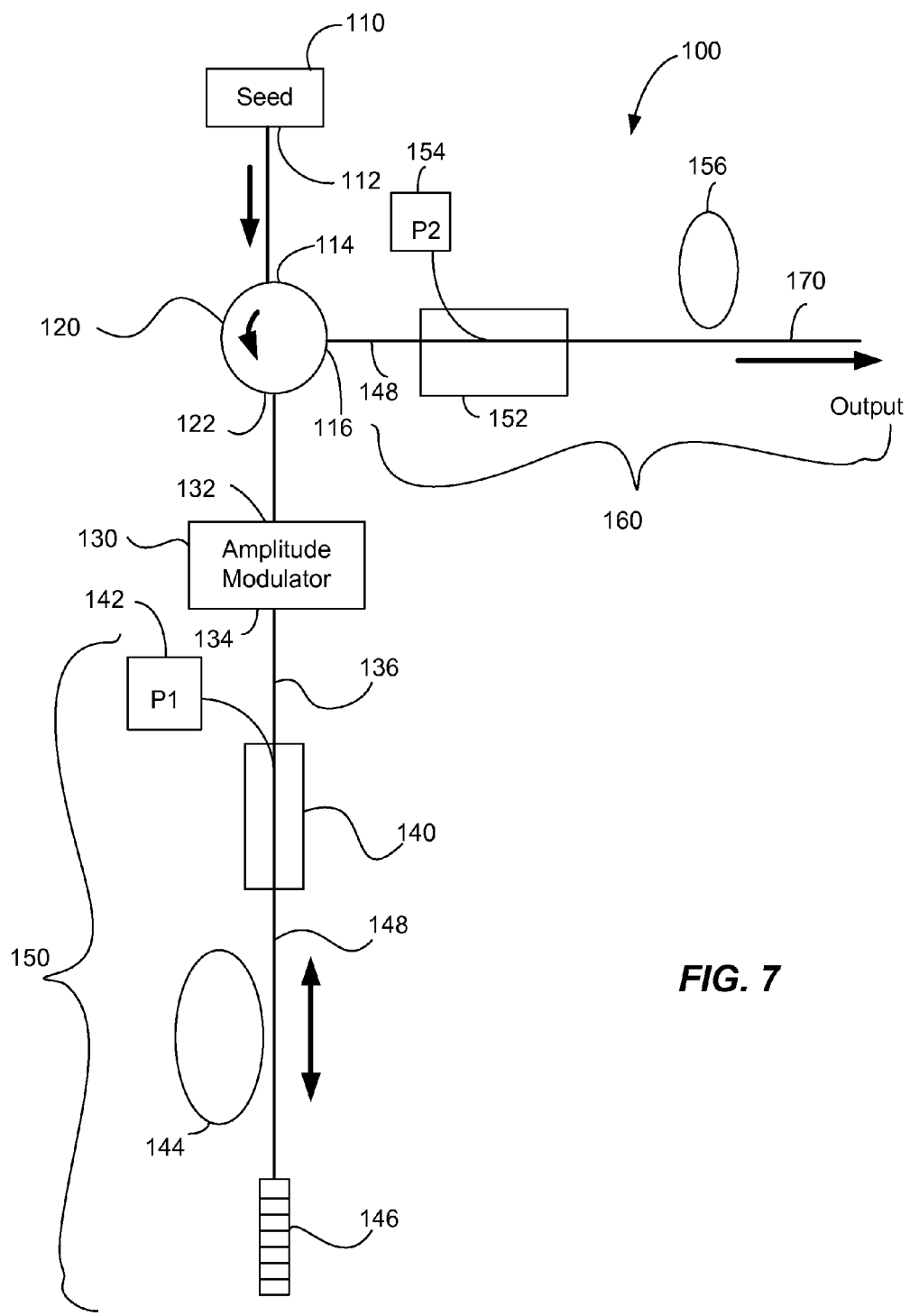
FIG. 7 is a simplified schematic illustration of a pulsed laser with tunable pulse characteristics providing an output burst of laser pulses with a beneficial pulse shape according to a an embodiment of the present invention.

With reference to FIG. 7, in an embodiment of the present invention, a pulsed laser source generating bursts of pulses of beneficial pulse shape is provided. The pulsed laser source includes a seed source 110 adapted to generate a seed signal and an optical circulator 120 having a first port 114 coupled to the seed source, a second port 122, and a third port 116. The pulsed laser source also includes an amplitude modulator 130 characterized by a first side 132 coupled to the second port 122 of the optical circulator and a second side 134. The pulsed laser source further includes a first optical amplifier 150 characterized by an input end 136 and a reflective end 146. The input end is coupled to the second side 134 of the amplitude modulator. Moreover, the pulsed laser source includes a second optical amplifier 160 coupled to the third port 116 of the optical circulator. Although FIG. 7 illustrates the use of one optical amplifier 160 coupled to the third port of the optical circulator, this is not required by some embodiments of the invention. In alternative embodiments, multiple optical amplifiers are utilized downstream of the optical circulator as appropriate to the particular applications. Additional description on embodiments of the present invention can be found in commonly assigned U.S. patent application Ser. No. 12/210,028 titled "Method and system for a Pulsed Laser Source Emitting Shaped Optical Waveforms" filed Sep. 12, 2008 which is a continuation in part of U.S. Pat. No. 7,428,253 titled "Method and System for Pulsed Laser Source with Shaped Optical Waveforms" issued Sep. 27, 2008, which are hereby incorporated by reference in their entirety for all purposes.

Figure 8:
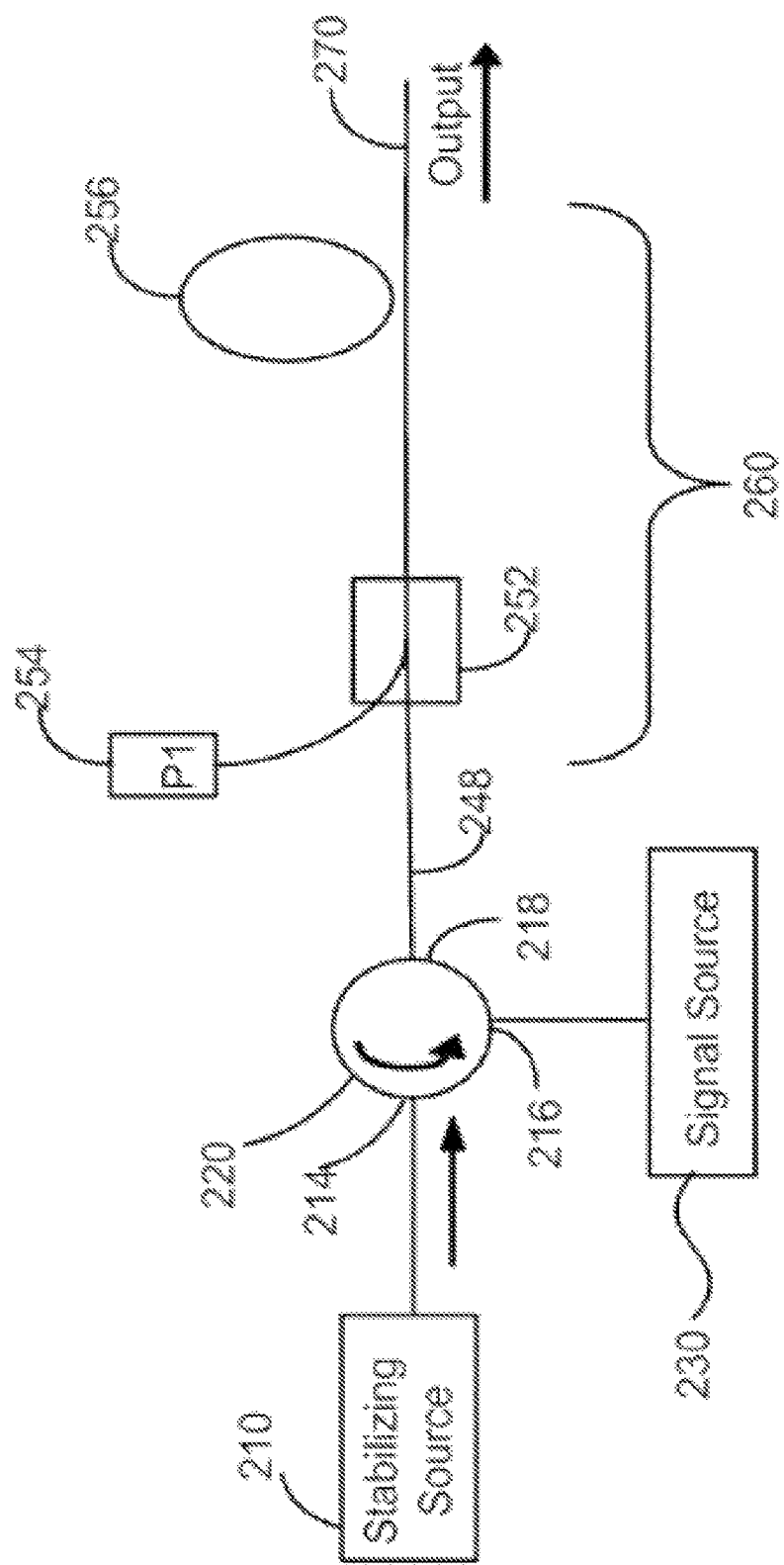
FIG. 8 is a simplified schematic illustration of a pulsed laser with tunable pulse characteristics providing an output burst of laser pulses with a beneficial pulse shape according to another embodiment of the present invention.

With reference to FIG. 8, in another embodiment of the present invention, a pulsed laser source generating bursts of pulses of beneficial pulse shape is provided. The pulsed laser source includes a stabilizing source 210 adapted to generate stabilizing optical radiation 216, and an optical circulator 220 having a first port 214 coupled to the stabilizing source, a second port 216, and a third port 218. The pulsed laser source also includes a signal source 230 adapted to produce a signal pulse of desired shape wherein the signal source is coupled to the second port 216 of the optical circulator. The pulsed laser source further includes an optical amplifier 260 coupled to the third port 218 of the optical circulator. Additional description on embodiments of the present invention can be found in commonly assigned U.S. Provisional Application No. 61/186,317, which is hereby incorporated by reference in its entirety for all purposes.

Figure 9:
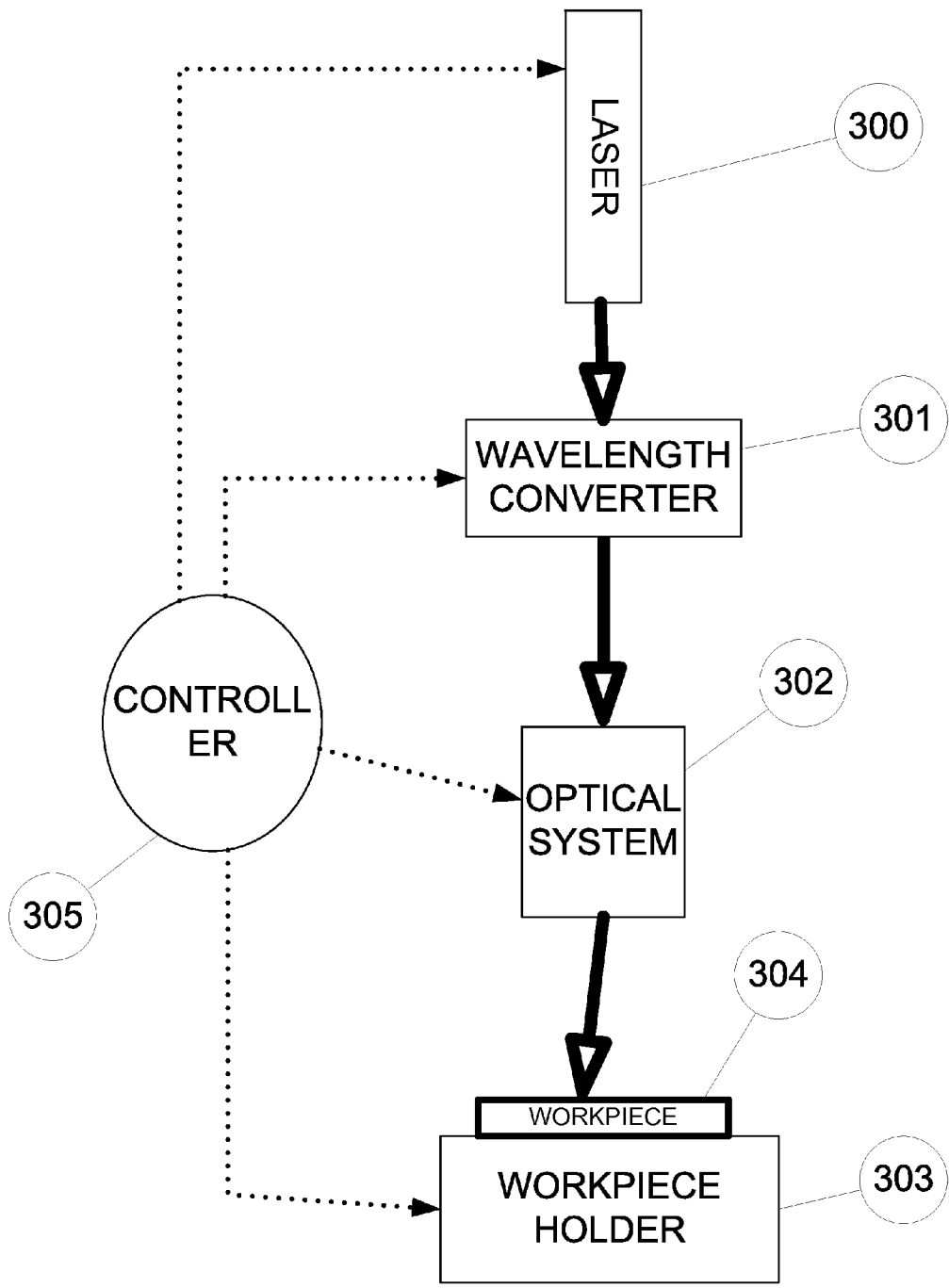
FIG. 9 is a simplified schematic illustration of a laser processing system suitable to scribe a line in a thin film on a substrate according to an embodiment of the present invention.

According to one particular embodiment of the present invention, FIG. 9 shows an exemplary laser processing system capable of scribing a line in a thin film material workpiece 304 using a laser generating a burst of pulses with beneficial pulse shape. The system includes a laser source 300, a wavelength converter 301, an optical system 302, a controller 305, and a workpiece 304 that is positioned on top of a workpiece holder 303. The laser source 300 provides laser pulses with certain characteristics, such as wavelength, pulse length, pulse shape, and pulse repetition rate. The wavelength may be selected by the controller. The wavelength may also be adjusted through the wavelength converter. The pulse length and pulse shape may be adjusted according to embodiments of the present invention to scribe a line in a thin film material workpiece using a burst of pulses with beneficial pulse shape.

A wavelength generated by the laser source 300 may be converted to a harmonic of a fundamental wavelength by the wavelength converter 301, such as a second, third, or fourth harmonic wavelength. Although some systems use different lasers, it is possible to obtain different wavelengths from one laser using a well-known process of harmonic generation in non-linear crystals. For example, ultraviolet light having a wavelength of approximately 353 nm may be obtained from an infrared laser having a wavelength of 1.06 μm by using harmonic tripling in a non-linear crystal. The wavelength converter may include a beam directing device, such as galvanometer-mounted mirrors. The mirrors may quickly change the path of a laser beam from the laser source to bypass the wavelength converter 302 may be used to adjust the spot size of the beam. The optical system may include lenses and mirrors for focusing a laser beam on the workpiece, and a component for directing the beam to various positions on the workpiece. In a specific embodiment, the component for directing the beam may be mirrors mounted on galvanometers. The controller may be used to control the optical system and the motion of the component for directing beam. For example, when scribing a line in a thin film workpiece 304, the optical system 302 may be controlled by the controller to scan the beam in a line along the surface of the workpiece such that each focused laser spot is directed to a location adjacent to the previous focused laser spot but with an overlap. In another embodiment, the optical system may focus the laser beam at the surface of the workpiece and the workpiece holder may be controlled by the controller to move the workpiece in a line such that each focused laser pulse impinges on a location adjacent to the previous focused laser pulse in the burst of laser pulses but with some spot overlap.

Figure 10:
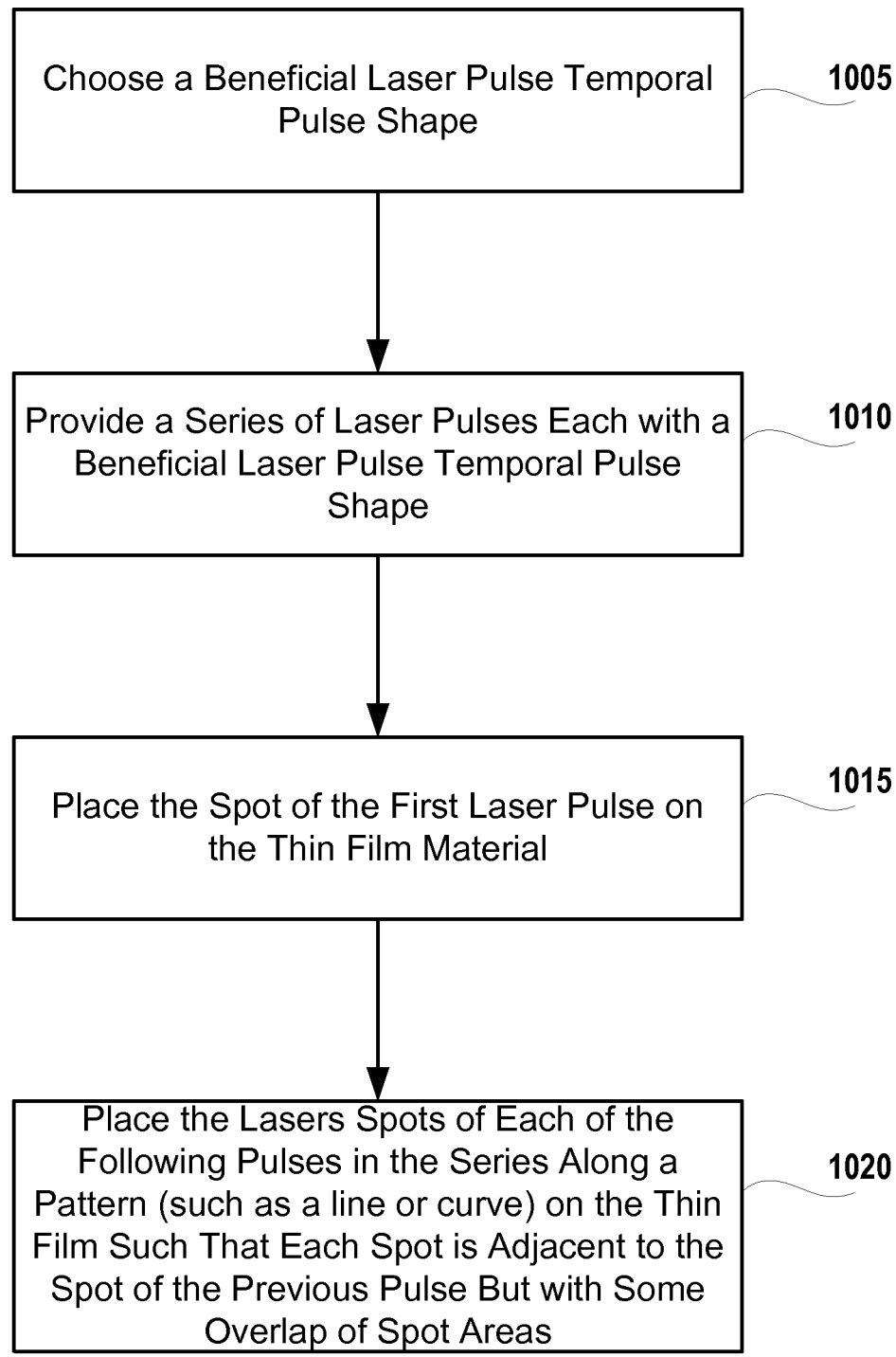
FIG. 10 is a flow chart showing a method for scribing a line in a thin film material using a burst of pulses with a beneficial pulse shape according to an embodiment of the present invention.

FIG. 10 is a flow chart showing a method for scribing a pattern in a thin film material using a burst of pulses with a beneficial pulse shape according to an embodiment of the present invention. In one embodiment the pattern can be a line and in another embodiment the pattern can be a curve. In operation 1005, a beneficial laser pulse temporal pulse shape in chosen. In operation 1010, a series of laser pulses, each having a beneficial laser pulse temporal pulse shape is provided. In operation 1015, a spot of the first laser pulse is placed on the thin film material. In operation 1020, the lasers spots of each of the following pulses are placed in a series along a pattern, which can be a line or a curve, on the thin film such that each spot is adjacent to the spot of the previous pulse but with some overlap of spot areas.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A laser-based processing method, comprising:
  providing a series of laser pulses characterized by a first pulse and at least 9 following pulses, where each laser pulse in the series is characterized by a spike/plateau chair laser pulse shape, and each pulse in the series is further characterized by a laser spot with a laser spot area; and
  removing a thin film of material, deposited on a substrate, along a pattern down to the substrate by:
    placing the laser spot of the first pulse through the substrate at a spot position on said thin film of material; and
    placing the laser spots of each of the following pulses in the series of pulses through the substrate at spot positions along said pattern on said thin film of material such that each spot position is adjacent to the spot position of the laser spot of the previous pulse, and there is an overlap of spot positions such that an area of each spot overlaps in some amount an area of each previous spot, wherein said laser pulse shape is configured such that no micro-cracks are formed in edges of the pattern in the thin film material.

2. The method of claim 1 wherein the pattern is a line.

3. The method of claim 1 wherein the pattern is a curve.

4. The method of claim 1 wherein the areas of two adjacent spots overlap more than 10% but less than 95%.

5. The method of claim 1 wherein the laser spot area is more than 0.0000001 Square centimeters but less than 0.0001 square centimeters.

6. The method of claim 1 wherein the thin film of material is zinc oxide.

7. The method of claim 1 wherein the thin film of material is a transparent conducting oxide.

8. The method of claim 1 wherein the thin film of material is selected from the group consisting of amorphous silicon, cadmium telluride, copper indium diselenide, copper indium gallium diselenide, and molybdenum.

9. The method of claim 1 wherein the laser pulse shape comprises a pulse with pulse length FWHM of more than 1 ns but less than 200 ns.

10. The method of claim 9 wherein the laser pulse shape has a rising edge risetime and a falling edge falltime such that the rising edge risetime is less than 10% of the pulse length.

11. The method of claim 10 wherein the laser pulse shape has a falling edge falltime such that the falling edge falltime is less than 30% of the pulse length.

12. A laser-based processing method comprising:
providing a series of laser pulses characterized by a first pulse and at least 9 following pulses, where each laser pulse in the series is characterized by a spike/plateau chair laser pulse shape, and each pulse in the series is further characterized by a laser spot with a laser spot area; and
removing a thin film of material, deposited on a substrate, along a pattern down to the substrate by:
placing the laser spot of the first pulse through the substrate at a spot position on said thin film of material; and
placing the laser spots of each of the following pulses in the series of pulses through the substrate at spot positions along said pattern on said thin film such that each spot position is adjacent to the spot position of the laser spot of the previous pulse, and there is an overlap of spot positions such that an area of each spot overlaps in some amount an area of each previous spot, wherein said laser pulse shape is configured such that no micro-cracks are formed in the substrate and no micro-cracks are formed on the edges of the pattern in the thin film of material.

13. The method of claim 12 wherein the pattern is a line.

14. The method of claim 12 wherein the pattern is a curve.

15. The method of claim 12 wherein the amount of spot overlap of the laser spot area of a following pulse with the laser spot area of a previous pulse is more than 10% but less than 95%.

16. The method of claim 12 wherein the laser spot area is more than 0.0000001 Square centimeters but less than 0.0001 square centimeters.

17. The method of claim 12 wherein the thin film of material is zinc oxide.

18. The method of claim 12 wherein the thin film of material is transparent conducting oxide.

19. The method of claim 12 wherein the thin film of material is chosen from among amorphous silicon, cadmium telluride, copper indium diselenide, copper indium gallium diselenide, and molybdenum.

20. The method of claim 12 wherein the laser pulse shape comprises a pulse with pulse length FWHM of more than 1 ns but less than 200 ns.

21. The method of claim 20 wherein the laser pulse shape has a rising edge, a falling edge, and an average power and is further characterized by a power spike having a spike duration that is substantially shorter than the pulse length and a peak power that is greater than the average power of the laser pulse.

22. The method of claim 21 wherein the laser pulse shape has a power spike of length FWHM of more than 0.3 ns and less than 30% of the pulse length.

23. The method of claim 21 wherein the laser pulse shape has a power spike with risetime more than 0.1 ns and less than 30% of the power spike length FWHM.

24. The method of claim 21 wherein the ratio of the peak power of the power spike to the average power of the laser pulse is greater than 1.5.

* * * * *